US010491961B2

(12) United States Patent
Petajan et al.

(10) Patent No.: US 10,491,961 B2
(45) Date of Patent: Nov. 26, 2019

(54) SYSTEM FOR ANNOTATING MEDIA CONTENT FOR AUTOMATIC CONTENT UNDERSTANDING

(71) Applicant: LiveClips LLC, El Segundo, CA (US)

(72) Inventors: Eric David Petajan, Watchung, NJ (US); Sreemanananth Sadanand, Stamford, CT (US); Ting-Hsiang Tony Hwang, Milford, CT (US)

(73) Assignee: LiveClips LLC, El Segundo, CA (US)

( * ) Notice: Subject to any disclaimer, the term of this patent is extended or adjusted under 35 U.S.C. 154(b) by 132 days.

(21) Appl. No.: 15/170,460

(22) Filed: Jun. 1, 2016

(65) Prior Publication Data

US 2016/0353180 A1 Dec. 1, 2016

Related U.S. Application Data

(60) Division of application No. 14/186,163, filed on Feb. 21, 2014, now Pat. No. 9,367,745, which is a (Continued)

(51) Int. Cl.
*G06F 17/20* (2006.01)
*H04N 21/488* (2011.01)
(Continued)

(52) U.S. Cl.
CPC ......... *H04N 21/4882* (2013.01); *G06F 16/48* (2019.01); *G06F 16/7867* (2019.01);
(Continued)

(58) Field of Classification Search
CPC .................................. G06K 9/00624–9/00724
See application file for complete search history.

(56) References Cited

U.S. PATENT DOCUMENTS 5,091,780 A 2/1992 Pomerleau
5,189,630 A 2/1993 Barstow et al.
(Continued)

FOREIGN PATENT DOCUMENTS

EP 1197020 B1 11/2007
EP 1968066 A1 9/2008
(Continued)

OTHER PUBLICATIONS

Final Rejection dated Feb. 4, 2014 in U.S. Appl. No. 12/272,170, filed Nov. 17, 2008 by Douglas W. Vunic.
(Continued)

*Primary Examiner* — Keith D Bloomquist
(74) *Attorney, Agent, or Firm* — Guntin & Gust, PLC; Robert Gingher

(57) ABSTRACT

A method to correct for temporal variability in incoming streams of media and data to optimize the performance of a pattern recognition system includes the steps of receiving from one of the incoming streams a point in time when an event is announced, applying probability distribution about the point in time, shifting a point of highest probability of the probability distribution back in time by an amount effective to accommodate for a delay between the event and the announcement, comparing a detected pattern of the event to a stored pattern of similar events and applying a confidence value to the comparison, and confirming to the pattern recognition system that the event occurred at the point of highest probability when the confidence score exceeds a predefined threshold. The method is useful to determine the time at which a particular play occurs during a sporting event, such as the time of a shot-on-goal in a soccer match.

15 Claims, 8 Drawing Sheets

Related U.S. Application Data continuation-in-part of application No. 13/836,605, filed on Mar. 15, 2013.

(60) Provisional application No. 61/637,344, filed on Apr. 24, 2012.

(51) Int. Cl.

| | | |
|---|---|---|
| *G06K 9/00* | (2006.01) | |
| *H04N 5/44* | (2011.01) | |
| *G06F 16/48* | (2019.01) | |
| *G06F 16/78* | (2019.01) | |
| *G11B 27/28* | (2006.01) | |
| *H04N 21/234* | (2011.01) | |
| *H04N 21/84* | (2011.01) | |
| *H04N 21/854* | (2011.01) | |
| *H04N 21/2187* | (2011.01) | |
| *G06T 7/70* | (2017.01) | |

(52) U.S. Cl.
CPC ..... *G06K 9/00442* (2013.01); *G06K 9/00724* (2013.01); *G06T 7/70* (2017.01); *G11B 27/28* (2013.01); *H04N 5/44* (2013.01); *H04N 21/2187* (2013.01); *H04N 21/23418* (2013.01); *H04N 21/84* (2013.01); *H04N 21/854* (2013.01)

(56) References Cited

U.S. PATENT DOCUMENTS

| | | |
|---|---|---|
| 5,526,479 A | 6/1996 | Barstow et al. |
| 5,539,454 A | 7/1996 | Williams |
| 5,671,347 A | 9/1997 | Barstow et al. |
| 5,892,536 A | 4/1999 | Logan et al. |
| 5,923,365 A | 7/1999 | Tamir et al. |
| 5,986,692 A | 11/1999 | Logan et al. |
| 6,088,455 A | 7/2000 | Logan et al. |
| 6,144,797 A | 11/2000 | MacCormack et al. |
| 6,204,862 B1 | 3/2001 | Barstow et al. |
| 6,763,069 B1 | 7/2004 | Divakaran et al. |
| 6,920,468 B1 | 7/2005 | Cousins et al. |
| 6,931,451 B1 | 8/2005 | Logan et al. |
| 7,055,166 B1 | 5/2006 | Logan et al. |
| 7,058,376 B2 | 6/2006 | Logan et al. |
| 7,211,000 B2 | 5/2007 | Jutzi et al. |
| 7,224,852 B2 | 5/2007 | Lipton et al. |
| 7,244,852 B2 | 7/2007 | Ku et al. |
| 7,373,587 B1 | 5/2008 | Barstow et al. |
| 7,399,277 B2 | 7/2008 | Saidara et al. |
| 7,460,149 B1 | 12/2008 | Donovan et al. |
| 7,596,759 B2 | 9/2009 | Verna et al. |
| 7,742,921 B1 | 6/2010 | Davis et al. |
| 7,773,670 B1 | 8/2010 | Puri et al. |
| 7,904,797 B2 | 3/2011 | Wong et al. |
| 2002/0059644 A1 | 5/2002 | Andrade et al. |
| 2002/0093591 A1 | 7/2002 | Gong et al. |
| 2002/0114493 A1 | 8/2002 | McNitt et al. |
| 2003/0083879 A1 | 5/2003 | Cyr et al. |
| 2003/0152277 A1 | 8/2003 | Hall, Jr. et al. |
| 2003/0160944 A1 | 8/2003 | Foote et al. |
| 2003/0186743 A1 | 10/2003 | MacGregor et al. |
| 2004/0064207 A1 | 4/2004 | Zacks et al. |
| 2004/0068758 A1 | 4/2004 | Daily et al. |
| 2004/0080615 A1 | 4/2004 | Klein et al. |
| 2004/0125877 A1 | 7/2004 | Chang et al. |
| 2004/0172593 A1 | 9/2004 | Wong et al. |
| 2004/0205482 A1 | 10/2004 | Basu et al. |
| 2005/0149299 A1 | 7/2005 | Bolt et al. |
| 2006/0044446 A1 | 3/2006 | Porter et al. |
| 2006/0170772 A1* | 8/2006 | McEwan .......... G08B 13/19602 348/152 |
| 2006/0227237 A1 | 10/2006 | Kienzle et al. |
| 2006/0246972 A1 | 11/2006 | Thomas et al. |
| 2007/0100521 A1 | 5/2007 | Grae et al. |
| 2007/0101394 A1 | 5/2007 | Fu et al. |
| 2007/0106507 A1 | 5/2007 | Charoenruengkit et al. |
| 2007/0245400 A1 | 10/2007 | Paek et al. |
| 2007/0256016 A1 | 11/2007 | Bedingfield |
| 2007/0277092 A1 | 11/2007 | Basson et al. |
| 2008/0019594 A1 | 1/2008 | Hiraizumi et al. |
| 2008/0088482 A1 | 4/2008 | Okada et al. |
| 2008/0089666 A1 | 4/2008 | Aman et al. |
| 2008/0130997 A1 | 6/2008 | Huang et al. |
| 2008/0138029 A1 | 6/2008 | Xu et al. |
| 2008/0175486 A1* | 7/2008 | Yamamoto ........ G06F 17/30796 382/206 |
| 2008/0177786 A1 | 7/2008 | Faisman et al. |
| 2008/0270338 A1 | 10/2008 | Adams et al. |
| 2008/0281592 A1 | 11/2008 | McKoen et al. |
| 2008/0282184 A1 | 11/2008 | Rose |
| 2008/0313140 A1 | 12/2008 | Pereira et al. |
| 2009/0024619 A1 | 1/2009 | Dallmeier et al. |
| 2009/0060342 A1* | 3/2009 | Chiang ............. G06K 9/00711 382/190 |
| 2009/0074235 A1* | 3/2009 | Lahr ................ G06F 17/30799 382/100 |
| 2009/0164462 A1 | 6/2009 | Snijder et al. |
| 2009/0208106 A1 | 8/2009 | Dunlop et al. |
| 2009/0249387 A1* | 10/2009 | Magdy ............. G06F 17/30787 725/32 |
| 2009/0313294 A1 | 12/2009 | Mei et al. |
| 2010/0005485 A1* | 1/2010 | Tian .................. G06K 9/00711 725/32 |
| 2010/0123830 A1 | 5/2010 | Vunic et al. |
| 2010/0158470 A1* | 6/2010 | Tzoukermann ... G06F 17/30038 386/241 |
| 2010/0245072 A1 | 9/2010 | Harel et al. |
| 2010/0287473 A1 | 11/2010 | Recesso et al. |
| 2010/0293187 A1 | 11/2010 | Biehn et al. |
| 2010/0306193 A1 | 12/2010 | Pereira et al. |
| 2010/0332809 A1 | 12/2010 | Noyes et al. |
| 2011/0052061 A1 | 3/2011 | Jeong et al. |
| 2011/0102678 A1 | 5/2011 | House et al. |
| 2011/0145182 A1 | 6/2011 | Dlugosch et al. |
| 2011/0288862 A1* | 11/2011 | Todic ..................... G10L 15/05 704/235 |
| 2012/0020524 A1 | 1/2012 | Ishikawa et al. |
| 2012/0123777 A1 | 5/2012 | Agapi et al. |
| 2012/0159290 A1 | 6/2012 | Pulsipher et al. |
| 2012/0166930 A1 | 6/2012 | Datar et al. |
| 2012/0219271 A1 | 8/2012 | Vunic et al. |
| 2013/0283143 A1 | 10/2013 | Petajan et al. |
| 2013/0293776 A1 | 11/2013 | Shih-Fu et al. |
| 2014/0028842 A1 | 1/2014 | Abramson et al. |
| 2015/0139610 A1 | 5/2015 | Syed et al. |
| 2017/0221523 A1 | 8/2017 | Petajan et al. |
| 2018/0336928 A1 | 11/2018 | Petajan et al. |

FOREIGN PATENT DOCUMENTS

| | | |
|---|---|---|
| WO | 2007132395 A1 | 11/2007 |
| WO | 2012/155279 | 11/2012 |

OTHER PUBLICATIONS

International Search Report and Written Opinion dated Dec. 27, 2012 in International Application No. PCT/ US2012/038516 filed May 18, 2012.

Invitation to Pay Additional Fees and, Where Applicable, Protest Fee and Annex Communication relating to the results of the Partial International Search dated Jun. 18, 2015 in International Application No. PCT/US2015/016166.

Non-final Office action dated May 23, 2013 in U.S. Appl. No. 12/272,170, filed Nov. 17, 2008 by Douglas W. Vunic.

Final Rejection dated Aug. 13, 2012 in U.S. Appl. No. 12/272,170, filed Nov. 17, 2008 by Douglas W. Vunic, 2008.

Final Rejection dated Aug. 26, 2014 in U.S. Appl. No. 12/272,170, filed Nov. 17, 2008 by Douglas W. Vunic, 2008.

Non-final Office action dated Dec. 22, 2011 in U.S. Appl. No. 12/272,170, filed Nov. 17, 2008 by Douglas W. Vunic, 2008.

(56) References Cited

OTHER PUBLICATIONS

Non-final Office action dated Jul. 8, 2013 in U.S. Appl. No. 13/111,738, filed May 19, 2011 by Douglas W. Vunic et al., 2008.
Notice of Allowance dated Dec. 30, 2014 in U.S. Appl. No. 12/272,170, filed Nov. 17, 2008 by Douglas W. Vunic, 2008.
International Search Report and Written Opinion dated Apr. 12, 2010 in International Application No. PCT/ US2009/064573 filed Nov. 16, 2009 by Douglas W. Vunic, 2009.
Final Rejection dated Mar. 14, 2014 in U.S. Appl. No. 13/111,738, filed May 19, 2011 by Douglas W. Vunic et al., 2011.
Final Rejection dated Sep. 9, 2014 in U.S. Appl. No. 13/111,738, filed May 19, 2011 by Douglas W. Vunic et al., 2011.
Notice of Allowance dated Dec. 22, 2014 in U.S. Appl. No. 13/111,738, filed May 19, 2011 by Douglas W. Vunic et al., 2011.
Supplementary European Search Report dated Sep. 25, 2014 in European Patent Application No. 12785552.6 filed May 18, 2012 by Douglas W. Vunic et al., 2012.
PCT/US13/37545; Written Opinion of the International Searching Authority;, dated 2013.
Written Opinion on the International Preliminary Examining Authority dated Jun. 28, 2013 in International Application No. PCT/US2012/038516 filed May 18, 2012 by Douglas W. Vunic et al., 2013.
Notice of Allowance dated Feb. 11, 2016 in U.S. Appl. No. 14/186,163, filed Feb. 21, 2014 Dy Eric David Petajan et al., 2014.
International Search Report and Written Opinion dated Aug. 3, 2015 in International Application No. PCT/ US2015/016166 filed Feb. 17, 2015 by Eric David Petajan et al., 2015.
Supplementary Partial European Search Report dated Jun. 16, 2016, European Patent Application No. 13781985.0 filed Apr. 22, 2013 by Eric David Petajan et al.
MPEG-7 Overview (version 10); (ISO/IEC JTC1/SC29/WG11 N6828);, http://mpeg. chiariglione.org/standards/mpeg-7 /mpeg-7 .html; 70 pp., 2004.
"'Evaluation of Smart Video for Transit Event Detection'", Project #BD549-49. Final Report;, 2009.
"PCT/US13/37545 International Search Report and Written Opinion", dated Jun. 9, 2013.
"PCT_US2013037546_ESR", Supplementary Partial European Search Report, dated Jun. 16, 2016.
Abdul Halin, Alfian , "Soccer Event Detection Via Collaborative Multimodal Feature Analysis and Candidate Ranking", URL:http://www.iajitorg/PDF/vol.10,no.5/4565-9.pdf; [retrieved on Jul. 24, 2015]; p. 1-p. 3, 2011.
Babaguchi, Noboru et al., ""Intermodal Collaboration: A Strategy for Semantic Content Analysis for Broadcasted Sports Video"", Proceedings 2003 International Conference on Image Processing (Cat. No. 03CH37429); Barcelona, Spain; Sep. 14-17, 2003; IEEE, 2003.
Beale, Stephen et al., "Semantic Analysis in the Mikrokosmos Machine Translation Project", 1995.
Diamantopoulos, Michael , """Event Detection for Intelligent Car Park Video Surveillance""", Science Direct, available online at www.sciencedirect.com, 2005.
D'Orazio, et al., "A Review of Vision-Based Systems for Soccer Video Analysis", Pattern Recognition; Elsevier Ltd. vol. 43, 2010.
Lu, Wei-Lwun et al., "Learning to Track and Identify Players from Broadcast Sports Videos", IEEE Transactions on Pattern Analysis and Machine Intelligence; IEEE Computer Society; USA; vol. 35, No. 7; Jul. 1, 2013, 2013.
Martinez., Jose , "MPEG-7: The Generic Multimedia Content Description Standard", IEEE Computer Society, 2002.
Rui, Yong , ""Automatically Extracting Highlights for TV Baseball Programs";", Proceedings ACM Multimedia, 2000.
Sadlier., David , """Event Detection Based on Generic Characteristics of Field-Sports""", ICME 2005—Proceedings of the IEEE International Conference on Multimedia and Expo, 2005.
Tian, Yin-Li , "Event Detection. Query. and Retrieval for Video Surveillance", Book Chapter for Artificial Intelligence for Maximizing Content Based Image Retrieval, 2010.
Wang, et al., "A Generic Framework for Semantic Sports Video Analysis Using Dynamic Bayesian Networks", IEEE. Proceedings of the 11th International Multimedia Modeling Conference, 2005.
Canadian Office Action, 2870454, dated Nov. 24, 2016.

\* cited by examiner

SYSTEM FOR ANNOTATING MEDIA CONTENT FOR AUTOMATIC CONTENT UNDERSTANDING

CROSS REFERENCE TO RELATED PATENT APPLICATION

This application is a division of and claims priority to U.S. patent application Ser. No. 14/186,163 filed Feb. 21, 2014, which is a Continuation-in-part of and claims priority to U.S. patent application Ser. No. 13/836,605 filed Mar. 15, 2013, which claims a benefit to the priority date of the filing of U.S. Provisional Patent Application Ser. No. 61/637,344 filed on Apr. 24, 2012. The disclosures of U.S. Provisional Patent Application Ser. No. 61/637,344, U.S. patent application Ser. No. 13/836,605 and U.S. patent application Ser. No. 14/186,163 are incorporated by reference herein in their entirety.

FIELD OF THE DISCLOSURE

This disclosure relates to media presentations (e.g. live sports events), and more particularly to a system for improving performance by generating annotations for the media stream.

BACKGROUND OF THE DISCLOSURE

A media presentation, such as a broadcast of an event, may be understood as a stream of audio/video frames (live media stream). It is desirable to add information to the media stream to enhance the viewer's experience; this is generally referred to as annotating the media stream. The annotation of a media stream is a tedious and time-consuming task for a human. Visual inspection of text, players, balls, and field/court position is mentally taxing and error prone. Key-board and mouse entry are needed to enter annotation data but are also error prone and mentally taxing. Accordingly, systems have been developed to at least partially automate the annotation process.

Pattern Recognition Systems (PRS), e.g. computer vision or Automatic Speech Recognition (ASR), process media streams in order to generate meaningful metadata. Recognition systems operating on natural media streams always perform with less than absolute accuracy due to the presence of noise. Computer Vision (CV) is notoriously error prone and ASR is only useable under constrained conditions. The measurement of system accuracy requires knowledge of the correct PRS result, referred to here as Ground Truth Metadata (GTM). The development of a PRS requires the generation of GTM that must be validated by Human Annotators (HA). GTM can consist of positions in space or time, labeled features, events, text, region boundaries, or any data with a unique label that allows referencing and comparison.

The time stamp of a piece of GTM may not be very precise or may have to be estimated based on its time of arrival relative to a live broadcast. GTM with imprecise timestamps can't be directly compared to PRS output which does have precise timestamps.

A compilation of acronyms used herein is appended to this Specification.

There remains a need for a system that can reduce the human time and effort required to create the GTM.

SUMMARY OF THE DISCLOSURE

We refer to a system for labeling features in a given frame of video (or audio) or events at a given point in time as a Media Stream Annotator (MSA). If accurate enough, a given PRS automatically generates metadata from the media streams that can be used to reduce the human time and effort required to create the GTM. According to an aspect of the disclosure, an MSA system and process, with a Human-Computer Interface (HCI), provides more efficient GTM generation and PRS input parameter adjustment.

GTM is used to verify PRS accuracy and adjust PRS input parameters or to guide algorithm development for optimal recognition accuracy. The GTM can be generated at low levels of detail in space and time, or at higher levels as events or states with start times and durations that may be imprecise compared to low-level video frame timing.

Adjustments to PRS input parameters that are designed to be static during a program should be applied to all sections of a program with associated GTM in order to maximize the average recognition accuracy and not just the accuracy of the given section or video frame. If the MSA processes live media, the effect of any automated PRS input parameter adjustments must be measured on all sections with (past and present) GTM before committing the changes for generation of final production output.

A system embodying the disclosure may be applied to both live and archived media programs and has the following features:

Random access into a given frame or section of the archived media stream and associated metadata.

Real-time display or graphic overlay of PRS-generated metadata on or near video frame display.

Single click approval of conversion of Proposed Annotation Data (PAD) into GTM

PRS recomputes all metadata when GTM changes.

Merge metadata from 3rd parties with human annotations.

Graphic overlay of compressed and decoded metadata on or near decoded low bit-rate video to enable real-time operation on mobile devices and consumer-grade internet connections.

Some pieces of GTM are not timestamped with enough temporal accuracy to compare the event with meta-data generated by the PRS directly. An object is then to define the start and stop times of the action surrounding the event, recognizing that the event may not occur at a distinct time. The probability of a given point in time being the center of the event can be modeled as a Gaussian or other typical statistical curve. The performance of the PRS is optimized by adjusting parameters that determine the ratio of false positive to false negative event or object recognition. These parameters can be adjusted dynamically as a function of the probability of the event occurring at each point in time to optimize the recognition performance.

GTM may be precisely time stamped but not localized spatially. In this case knowledge of the existence of the object in the camera view of the scene can be used to spend the resources to find the object or temporarily adjust PRS parameters to increase the probability of detecting the object at the expense of higher false positive rates. The localization of the miniboard and the subregions containing the game clock, score, etc. can be determined more efficiently by knowing when game play occurred, and the current clock and score values.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

The accuracy of any PRS depends on the application of constraints that reduce the number or range of possible results. These constraints can take the form of a priori information, physical and logical constraints, or partial recognition results with high reliability. A priori information for sports includes the type of sport, stadium architecture and location, date and time, teams, players, broadcaster, language, and the media ingest process (e.g., original AN resolution and transcoding). Physical constraints include camera inertia, camera mount type, lighting, and the physics of players, balls, equipment, courts, fields, and boundaries. Logical constraints include the rules of the game, sports production methods, uniform colors and patterns, and scoreboard operation. Some information can be reliably extracted from the media stream with minimal a priori information and can be used to "boot strap" subsequent recognition processes. For example, the presence of the graphical miniboard overlaid on the game video (shown in FIG. 4) can be detected with only knowledge of the sport and the broadcaster (e.g., ESPN, FOX Sports, etc).

If a live media sporting event is processed in real time, only the current and past media streams are available for pattern recognition and metadata generation. A recorded sporting event can be processed with access to any frame in the entire program. The PRS processing a live event can become more accurate as time progresses since more information is available over time, while any frame from a recorded event can be analyzed repeatedly from the past or the future until maximum accuracy is achieved.

The annotation of a media stream is a tedious and time-consuming task for a human. Visual inspection of text, players, balls, and field/court position is mentally taxing and error prone. Keyboard and mouse entry are needed to enter annotation data but are also error prone and mentally taxing. Human annotation productivity (speed and accuracy) is greatly improved by properly displaying available automatically generated Proposed Annotation Data (PAD) and thereby minimizing the mouse and keyboard input needed to edit and approve the PAD. If the PAD is correct, the Human Annotator (HA) can simultaneously approve the current frame and select the next frame for annotation with only one press of a key or mouse button. The PAD is the current best automatically generated metadata that can be delivered to the user without significant delay. Waiting for the system to maximize the accuracy of the PAD may decrease editing by the HA but will also delay the approval of the given frame.

Figure 1:
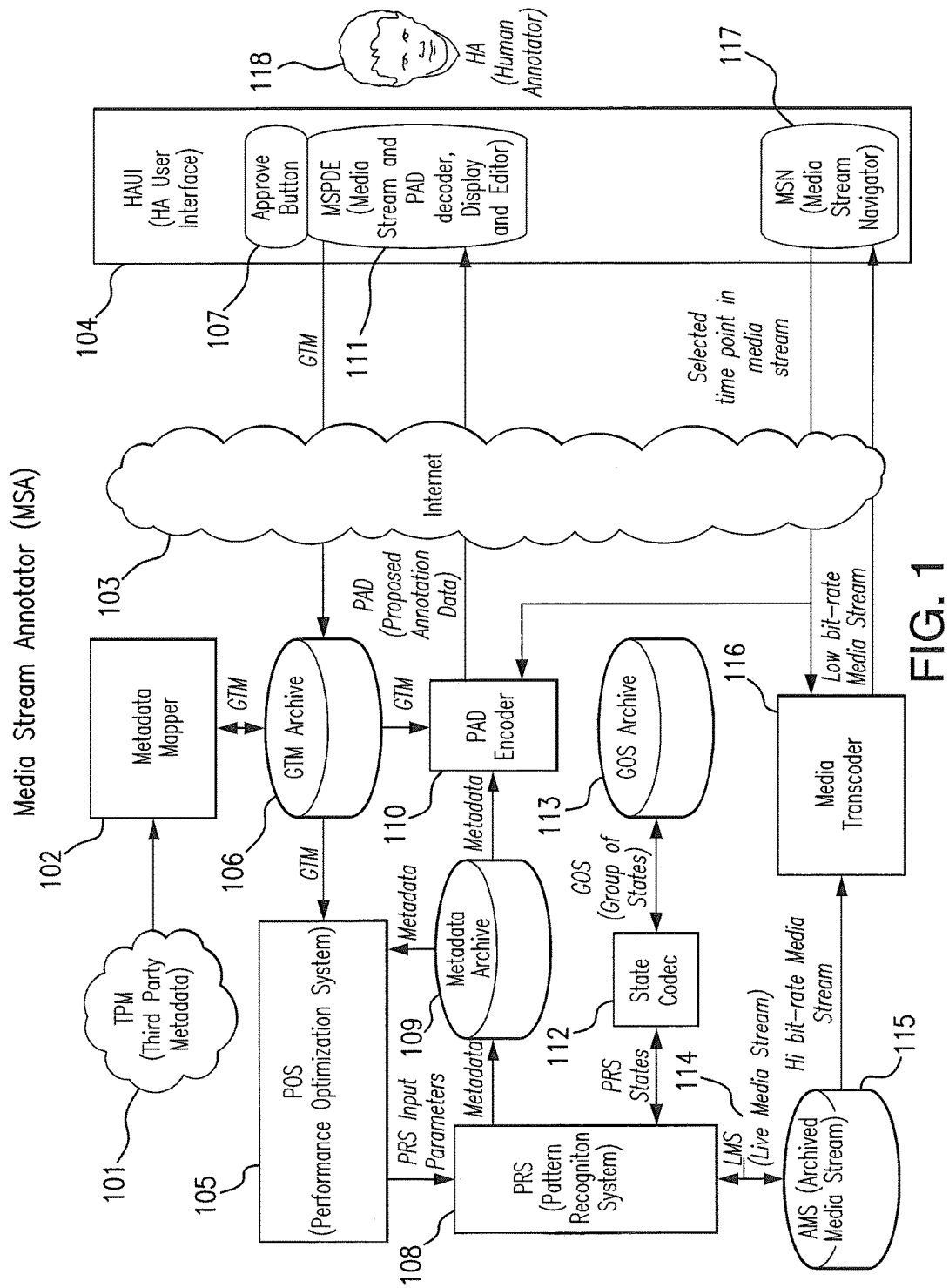
FIG. 1 is a schematic illustration of the Media Stream Annotator (MSA), according to an embodiment of the disclosure.

FIG. 1 shows a Media Stream Annotator (MSA) system according to an embodiment of the disclosure. The MSA ingests both live and archived media streams (LMS 114 and AMS 115), and optional Third Party Metadata (TPM) 101 and input from the HA 118. The PAD is derived from a combination of PRS 108 result metadata and TPM 101. Meta-data output by PRS 108 is archived in Metadata Archive 109. If the TPM 101 is available during live events the system can convert the TPM 101 to GTM via the Metadata Mapper 102 and then use the Performance Optimization System (POS) 105 to adjust PRS Input Parameters to improve metadata accuracy for both past (AMS 115) and presently ingested media (LMS 114). The PAD Encoder 110 merges GTM with metadata for each media frame and encodes the PAD into a compressed form suitable for transmission to the Human Annotator User Interface (HAUI) 104 via a suitable network, e.g. Internet 103. This information is subsequently decoded and displayed to the HA, in a form the HA can edit, by a Media Stream and PAD Decoder, Display and Editor (MSPDE) 111. The HAUI also includes a Media Stream Navigator (MSN) 117 which the HA uses to select time points in the media stream whose corresponding frames are to be annotated. A low bit-rate version of the media stream is transcoded from the AMS by a Media Transcoder 116 and then transmitted to the HAUI As GTM is generated by the HA 118 and stored in the GTM Archive 106, the POS 105 compares the PRS 108 output metadata to the GTM and detects significant differences between them. During the design and development of the PRS 108, input parameters are set with initial estimated values that produce accurate results on an example set of media streams and associated GTM. These parameter values are adjusted by the POS 105 until the difference between all the GTM and the PRS 108 generated metadata is minimized.

During development (as opposed to live production) the POS 105 does not need to operate in real time and exhaustive optimization algorithms may be used. During a live program the POS 105 should operate as fast as possible to improve PRS 108 performance each time new GTM is generated by the HA 118; faster optimization algorithms are therefore used during a live program. The POS 105 is also invoked when new TPM 101 is converted to GTM.

The choice of distance metric between PRS 108 output metadata and GTM depends on the type of data and the allowable variation. For example, in a presentation of a football game the score information extracted from the miniboard must be absolutely accurate while the spatial position of a player on the field can vary. If one PRS input parameter affects multiple types of results, then the distance values for each type can be weighted in a linear combination of distances in order to calculate a single distance for a given frame or time segment of the game.

A variety of TPM 101 (e.g. from stats.com) is available after a delay period from the live action that can be used as GTM either during development or after the delay period during a live program. Since the TPM is delayed by a non-specific period of time, it must be aligned in time with the program. Alignment can either be done manually, or the GTM can be aligned with TPM 101, and/or the PRS 108 result metadata can be aligned using fuzzy matching techniques.

The PRS 108 maintains a set of state variables that change over time as models of the environment, players, overlay graphics, cameras, and weather are updated. The arrival of TPM 101 and, in turn, GTM can drive changes to both current and past state variables. If the history of the state variables is not stored persistently, the POS 105 would have to start the media stream from the beginning in order to use the PRS 108 to regenerate metadata using new PRS 108 Input Parameters. The amount of PRS 108 state variable information can be large, and is compressed using State Codec 112 into one or more sequences of Group Of States (GOS) such that a temporal section of PRS States is encoded and decoded as a group for greater compression efficiency and retrieval speed. The GOS is stored in a GOS Archive 113. The number of media frames in a GOS can be as few as one.

If the PRS 108 result metadata is stored persistently, the HA can navigate to a past point in time and immediately retrieve the associated metadata or GTM via the PAD Encoder 110, which formats and compresses the PAD for delivery to the HA 118 over the network.

Figure 2:
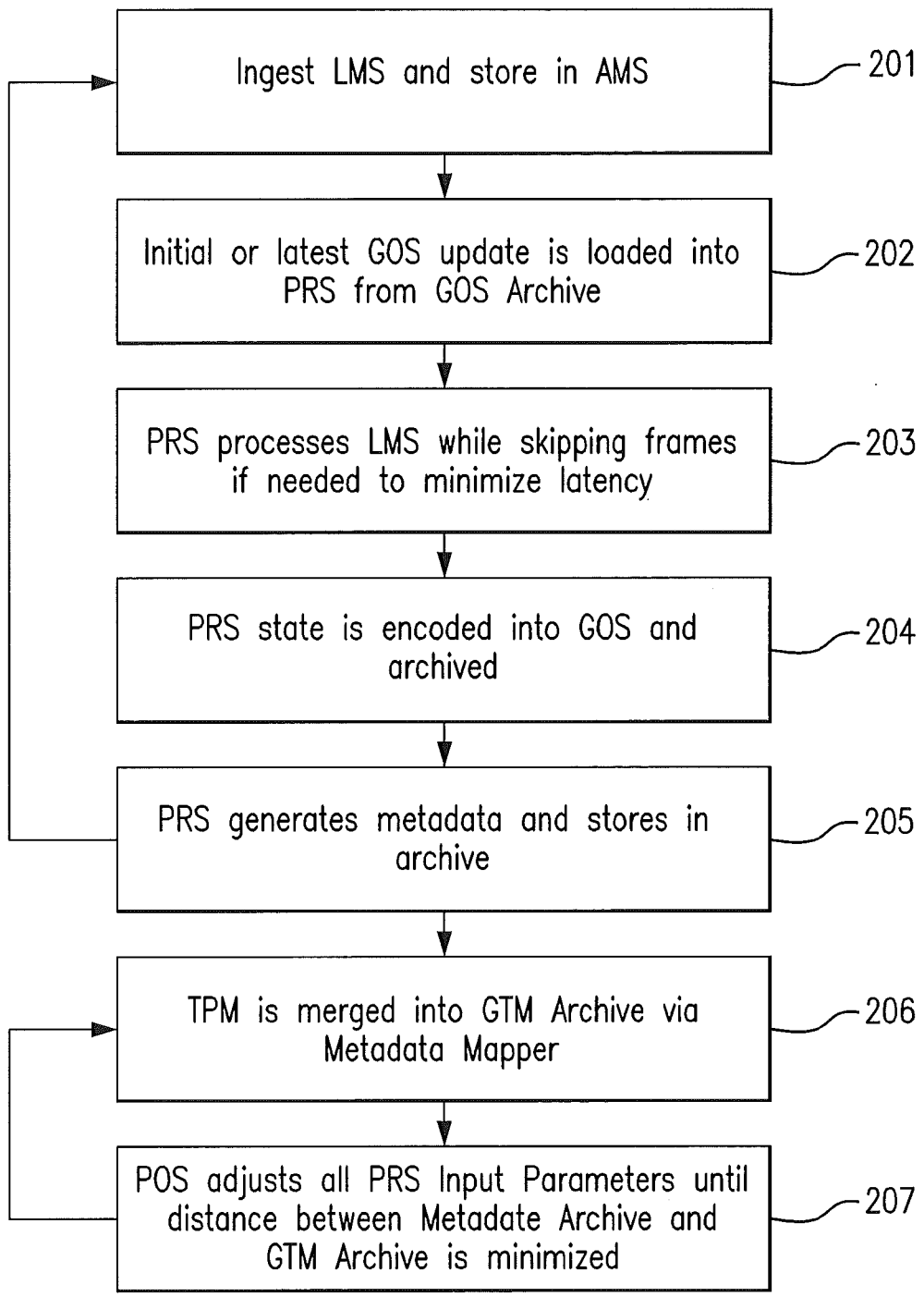
FIG. 2 is a schematic illustration of the Media Stream Annotator flow chart during Third Party Metadata (TPM) ingest, according to an embodiment of the disclosure.

FIG. 2 shows a flow chart for MSA operation, according to an embodiment of the disclosure in which both a live media stream (LMS) and TPM are ingested. All LMS is archived in the AMS (step 201). At system startup, the initial or default values of the GOS are input to the PRS which then starts processing the LMS in real time (step 202). If the PRS does not have sufficient resources to process every LMS frame, the PRS will skip frames to minimize the latency between a given LMS frame and its associated result Metadata (step 203). Periodically, the internal state variable values of the PRS are encoded into GOS and archived (step 204). Finally, the PRS generates metadata which is archived (step 205); the process returns to step 201 and the next or most recent next media frame is ingested. The processing loop 201-205 may iterate indefinitely.

When TPM arrives via the Internet, it is merged with any GTM that exists for that media frame via the Metadata Mapper (step 206). The POS is then notified of the new GTM and generates new sets of PRS Input Parameters, while comparing all resulting Metadata to any corresponding GTM for each set until an optimal set of PRS Input Parameters are found that minimize the global distance between all GTM and the corresponding Metadata (step 207).

Figure 3:
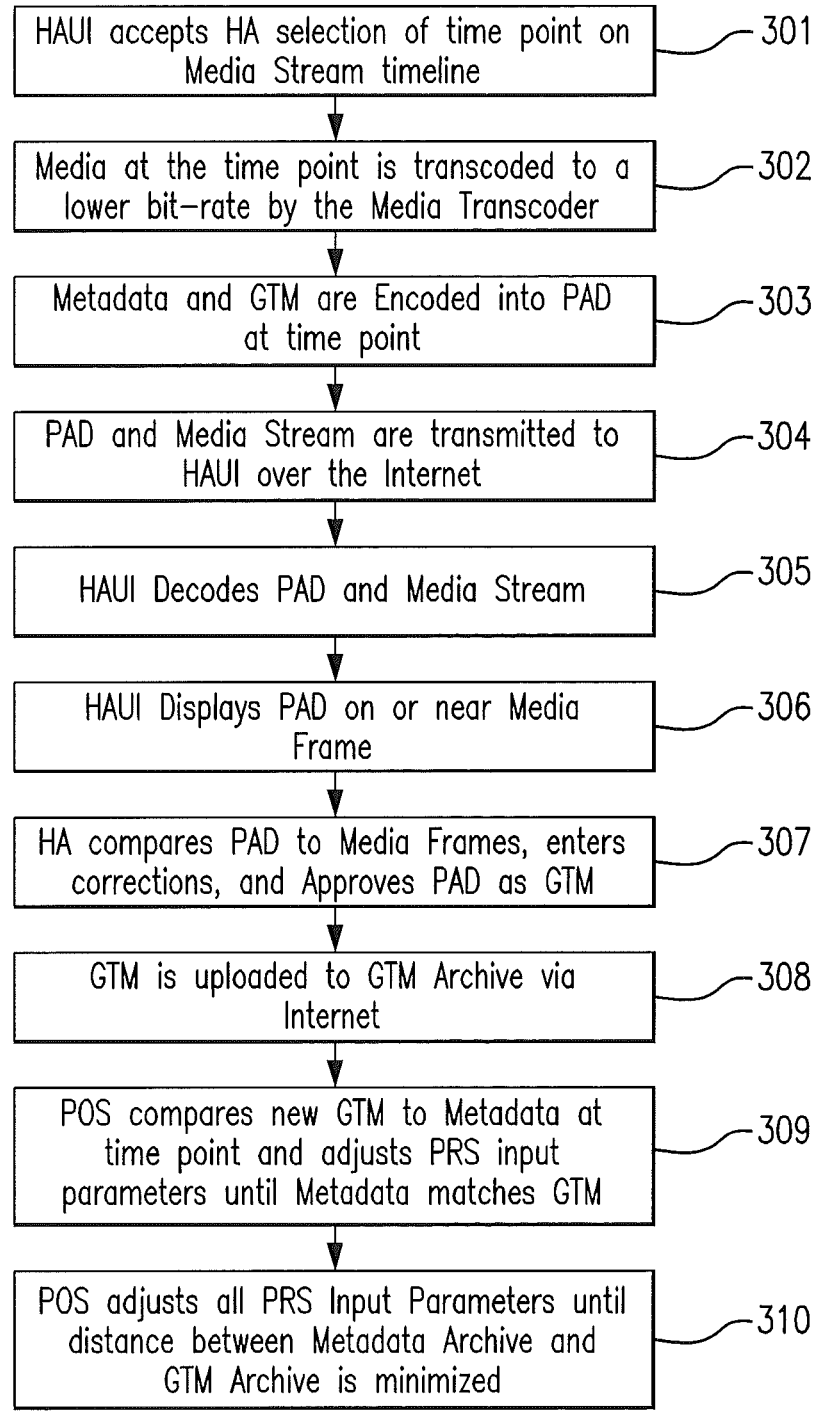
FIG. 3 is a schematic illustration of the Media Stream Annotator flow chart during Human Annotation, according to an embodiment of the disclosure.

FIG. 3 shows a flow chart for MSA operation while the HA approves new GTM. This process operates in parallel with the process shown in the flowchart of FIG. 2. The HA must first select a point on the media stream timeline for annotation (step 301). The HA can find a point in time by dragging a graphical cursor on a media player while viewing a low bit-rate version of the media stream transcoded from the AMS (step 302). The Metadata and any existing GTM associated with the selected time point are retrieved from their respective archives 109, 106 and encoded into the PAD (step 303); transmitted with the Media Stream to the HAUI over the Internet (step 304); and presented to the HA via the HAUI after decoding both PAD and low bit-rate Media Stream (step 305). The HAUI displays the PAD on or near the displayed Media Frame (step 306). The HA compares the PAD with the Media Frame and either clicks on an Approve button 107 or corrects the PAD using an editor and approves the PAD (step 307). After approval of the PAD, the HAUI transmits the corrected and/or approved PAD as new GTM for storage in the GTM Archive (step 308). The POS is then notified of the new GTM and generates new sets of PRS Input Parameters, while comparing all resulting Metadata to any corresponding GTM for each set (step 309) until an optimal set of PRS Input Parameters are found that minimize the global distance between all GTM and the corresponding Metadata (step 310).

If the MSA is operating only on the AMS (and not on the LMS), the POS can perform more exhaustive and time consuming algorithms to minimize the distance between GTM and Metadata; the consequence of incomplete or less accurate Metadata is more editing time for the HA. If the MSA is operating on LMS during live production, the POS is constrained to not update the PRS Input Parameters for live production until the Metadata accuracy is maximized.

The HA does not need any special skills other than a basic knowledge of the media stream content (e.g. rules of the sporting event) and facility with a basic computer interface. PRS performance depends on the collection of large amounts of GTM to ensure that optimization by the POS will result in optimal PRS performance on new media streams. Accordingly, it is usually advantageous to employ multiple HAs for a given media stream. The pool of HAs is increased if the HAUI client can communicate with the rest of the system over the consumer-grade internet or mobile internet connections which have limited capacity. The main consumer of internet capacity is the media stream that is delivered to the HAUI for decoding and display. Fortunately, the bit-rate of the media stream can be greatly lowered to allow carriage over consumer or mobile internet connections by transcoding the video to a lower resolution and quality. Much of the bit-rate needed for high quality compression of sporting events is applied to complex regions in the video, such as views containing the numerous spectators at the event; however, the HA does not need high quality video of the spectators for annotation. Instead, the HA needs a minimal visual quality for the miniboard, player identification, ball tracking, and field markings which is easily achieved with a minimal compressed bit-rate.

The PAD is also transmitted to the HAUI, but this information is easily compressed as text, graphical coordinates, geometric objects, color properties or animation data. All PAD can be losslessly compressed using statistical compression techniques (e.g. zip), but animation data can be highly compressed using lossy animation stream codecs such as can be found in the MPEG-4 SNHC standard tools (e.g. Face and Body Animation and 3D Mesh Coding).

Figure 4:
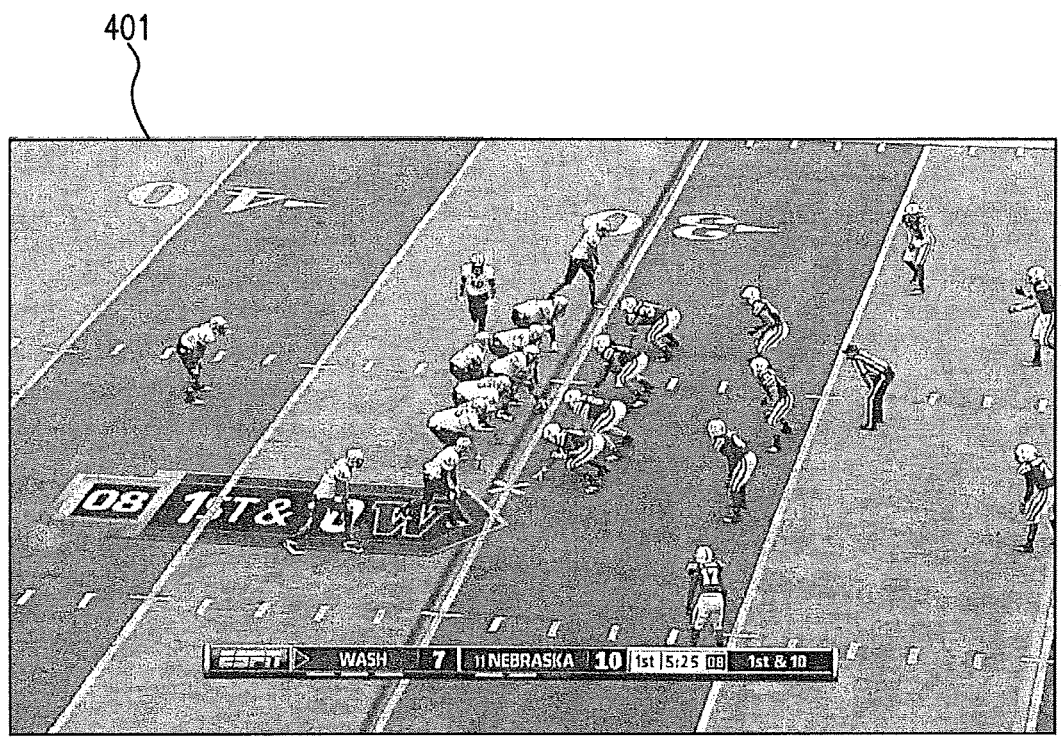
FIG. 4 is a schematic illustration of a football mini-board, according to an embodiment of the disclosure.

The display of the transmitted and decoded PAD to the HA is arranged for clearest viewing and comparison between the video and the PAD. For example, as shown in FIG. 4, the miniboard content from the PAD should be displayed below the video frame in its own window pane 402 and vertically aligned with the miniboard in the video 401. PAD content relating to natural (non-graphical) objects in the video should be graphically overlayed on the video.

Editing of the PAD by the HA can be done either in the miniboard text window directly for miniboard data or by dragging spatial location data directly on the video into the correct position (e.g. field lines or player IDs). The combined use of low bit-rate, adequate quality video and compressed text, graphics and animation data which is composited on the video results in a HAUI that can be used with low bit-rate internet connections.

Referring back to FIG. 1, the Metadata Archive 109 and the GTM Archive 106 are ideally designed and implemented to provide fast in-memory access to metadata while writing archive contents to disk as often as needed to allow fast recovery after system failure (power outage, etc). In addition to the inherent speed of memory access (vs disk access), the metadata archives should ideally be architected to provide fast search and data derivation operations. Fast search is needed to find corresponding entries in the GTM 106 vs Metadata 109 archives, and to support the asynchronous writes to the GTM Archive 106 from the Metadata Mapper 102. Preferred designs of the data structures in the archives that support fast search include the use of linked lists and hash tables. Linked lists enable insert edit operations without the need to move blocks of data to accommodate new data. Hash tables provide fast address lookup of sparse datasets.

The ingest of TPM 101 requires that the TPM timestamps be aligned with the GTM 106 and Metadata 109 Archive timestamps. This alignment operation may involve multiple passes over all datasets while calculating accumulated distance metrics to guide the alignment. The ingest of multiple overlapping/redundant TPM requires that a policy be established for dealing with conflicting or inconsistent metadata. In case there is conflict between TPMs 101, the Metadata Mapper 102 should ideally compare the PRS 108 generated Metadata 109 to the conflicting TPMs 101 in case other prior knowledge does not resolve the conflict. If the conflict can't be reliably resolved, then a confidence value should ideally be established for the given metadata which is also stored in the GTM 106. Alternatively, conflicting data can be omitted from the GTM 106.

The GTM 106 and Metadata 109 Archives should ideally contain processes for efficiently performing common operations on the archives. For example, if the time base of the metadata needs adjustment, an internal archive process could adjust each timestamp in the whole archive without impacting other communication channels, or tying up other processing resources.

An example of TPM is the game clock from a live sporting event. TPM game clocks typically consist of an individual message for each tick/second of the clock containing the clock value. The delay between the live clock value at the sports venue and the delivered clock value message can be seconds or tens of seconds with variation. The PRS is recognizing the clock from the live video feed and the start time of the game is published in advance. The Metadata Mapper 102 should use all of this information to accurately align the TPM clock ticks with the time base of the GTM 106 and Metadata 109 Archives. At the beginning of the game, there might not be enough data to determine this alignment very accurately, but as time moves forward, more metadata is accumulated and past alignments can be update to greater accuracy. [0053] Another desirable feature of the GTM 106 and Metadata 109 archives is the ability to virtually repopulate the archives as an emulation of replaying of the original ingest and processing of the TPM. This emulation feature is useful for system tuning and debugging.

Human media annotators may not be able to specify the time of an event with enough accuracy to be used directly by the POS to optimize the performance of the PRS. The temporal inaccuracy may be a result of lack of game clock time associated with the event coupled with a variable delay between the actual event and the announcement of the event. For example, in soccer an unsuccessful shot-on-goal is not indicated on the miniboard. The exact time of a shot-on-goal is not clearly defined. Unsuccessful shots-on-goal start with a kick or bounce off of player and end when the ball passes the plane of the goal opening. Additional temporal variability is caused by the video transmission delay, and delayed reaction time of the human annotator. The HA may be at the game in the stadium and as such have no transmission delay, watching a webcast with first transmission delay, or watching on television with a second, different from the first, transmission delay. Also, each HA has an individual reaction time and an individual typing speed further adding variable and potentially significant delays. If no game clock information is associated with the event annotation message then these independent delay sources can cause tens of seconds of variable delay from physical event to receipt of HA metadata into the POS.

Figure 5A:
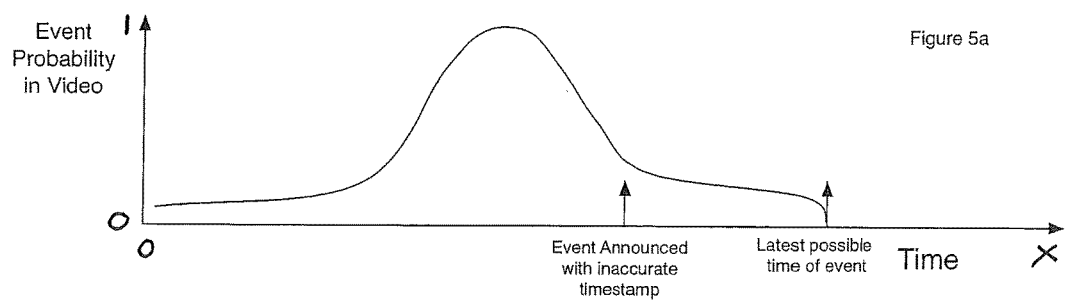
FIGS. 5A-5C present a sequence of graphs illustrating a method to accurately determine when an event occurs.
Figure 5B:
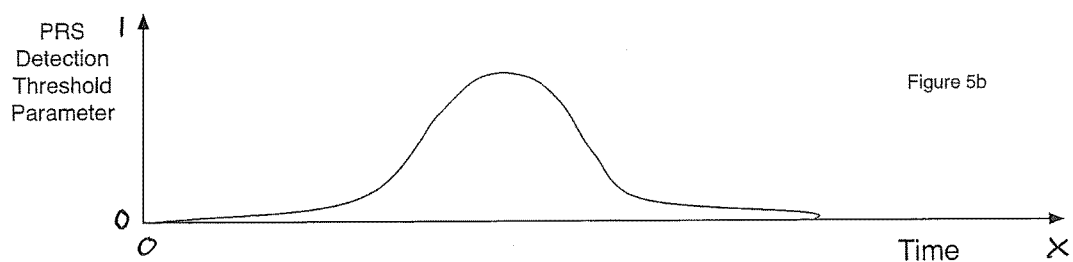
Figure 5C:
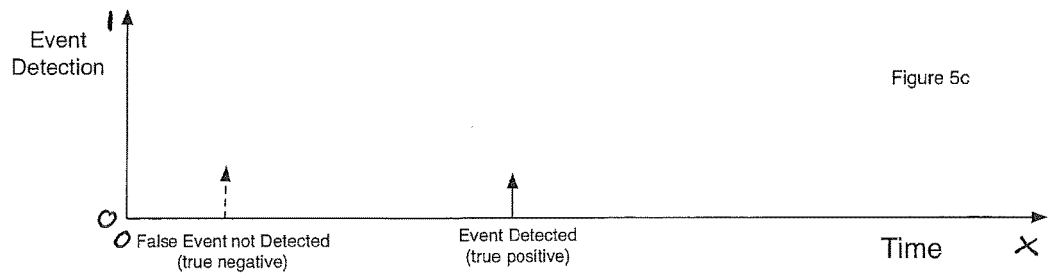

FIGS. 5A, 5B, 5C illustrate graphs sharing a common timeline that progresses from a start time, 0, to some later time "x". The vertical axis in FIG. 5A is the probability that an event occurred at a given point in time and ranges from O (no probability) to 1 (definite). An announced event is shown in the timeline and a Gaussian probability distribution is calculated with a digital processor and stored in memory to be placed around the time of the received event announcement. The center of the probability distribution is shifted back in time to account for the delay between the actual event and the announcement b copying the stored values to a new address range representing a shift in time. The probability distribution is set to zero after a point in the future that is the difference between the maximum delay of the live video feed and the HA metadata message receipt time.

The performance of the PRS is optimized by the POS by adjusting parameters that affect the sensitivity of pattern detectors in the PRS. A given detection parameter is a threshold value that is compared to a recognition confidence score or a distance between a stored pattern and a candidate pattern. If the score is above the threshold then the event is detected. Alternatively, if the distance is below the threshold then the event is not detected. The Event Probability in FIG. 5a can be used to modulate the detection threshold in order to reduce the number of false event detections and increase the number of true event detections as shown in FIG. 5b.

FIG. 5c shows the result of applying the modulated Detection Threshold Parameter to the PRS. The false detection of an event was prevented while the true detection of the event succeeded.

Figure 6A:
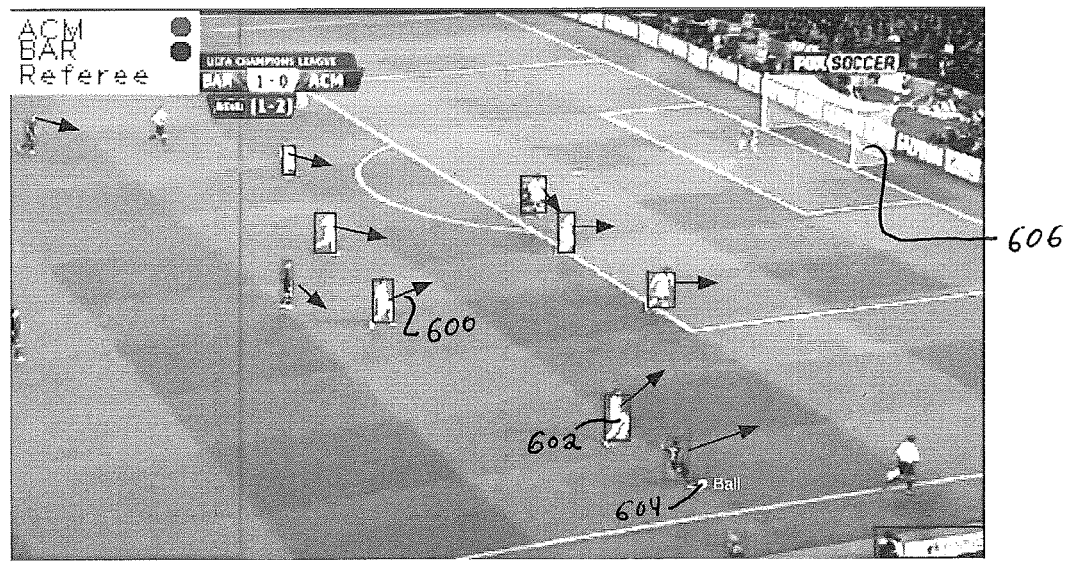
FIGS. 6A-6B illustrate spatial summarization as a function of action on an athletic playing field.
Figure 6B:
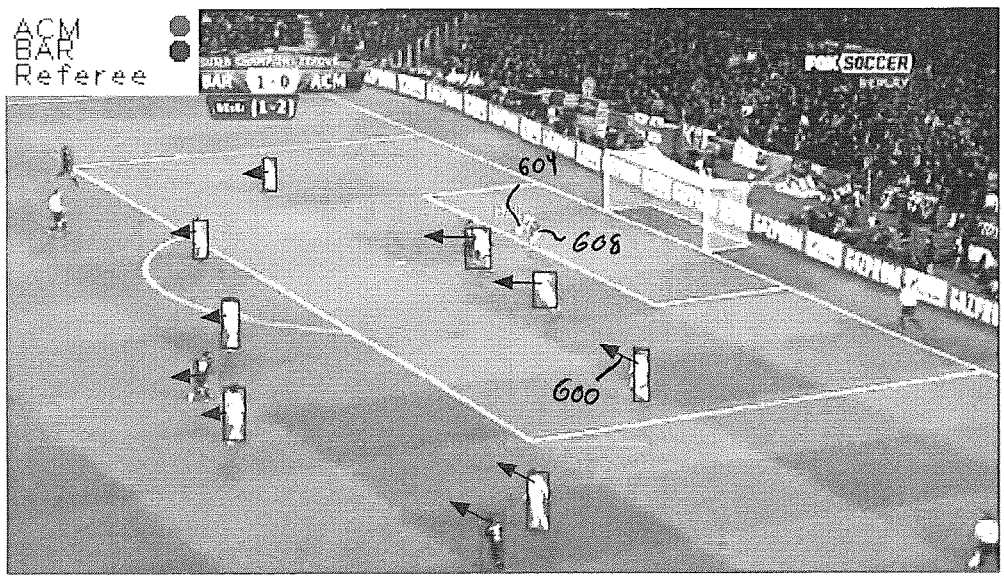

The PRS contains a variety of processes for recognizing objects or patterns and detecting events. One approach to detecting shots-on-goal is to first detect players and then summarize the motion of the players on each team in both space (spatial summarization) and time (temporal summarization). One approach to spatial summarization is to quantify the Player Flow Field (PFF) 600 which is the position and velocity vector of each player 602 across each pair of consecutive frames. FIG. 6a shows the PFF and the ball position at the start of a shot-on-goal when the ball 604 is kicked toward the goal 606. FIG. 6b shows the player flow field 600 several seconds later when the goalie 608 catches the ball 604. Note that the general direction of the PFF 600 is distinctly different between the two frames.

The PFF is calculated by first locating players by the color of their uniforms which contrast with the field color. Camera motion is then estimated using optical flow while player velocity vectors are calculated from the change in player location between each pair of consecutive frames. Field motion is then derived from camera motion and is subtracted from player motion to compute the Player Tracking Metadata (PTM) relative to the field. The PFF is computed from the PTM by coarsely quantizing and averaging the positions and velocity vectors to simplify subsequent classification.

Figure 7:
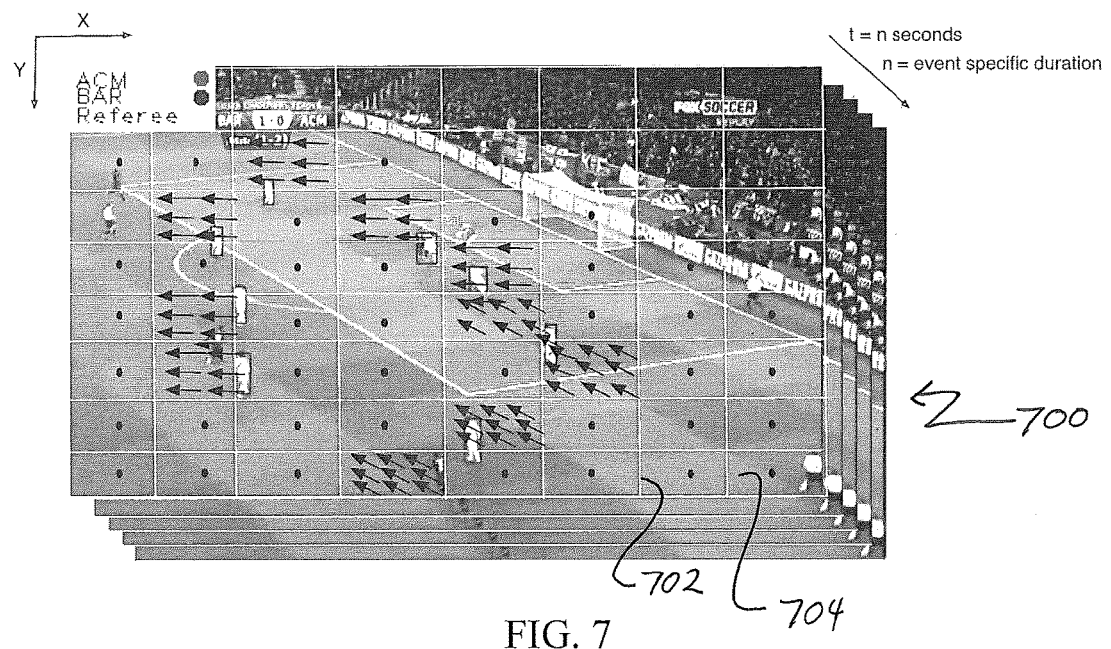
FIG. 7 illustrates a method for temporal summarization.
Figure 8:
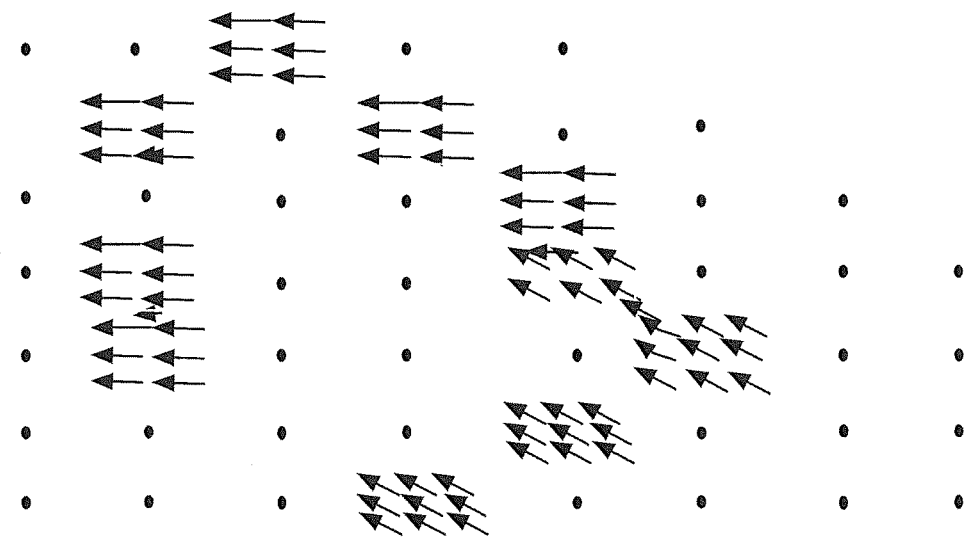
FIG. 8 illustrates a combination of spatial summarization and temporal summarization.

The PFF summarizes the PTM both temporally and spatially. Temporal summarization is accomplished by averaging the quantized positions and velocity vectors in the PTM across a plurality of frame segments 700 as shown in FIG. 7. The high variability of PTMs in a game is reduced and normalized by dividing the field area into a grid 702 and individually measuring the PTMs in each cell 704 of the grid 702. An exemplary PFF is shown in FIG. 8. A play is a time window containing an announced event and is represented as a sequence of PFFs. Based on the type of play, statistics can be generated during a time window around each such play. Accordingly, the Player Flow Field (PFF) sequence computed over the duration of the play is matched against pre-trained Player Flow Types (PFT) and the closest match is taken as the PFT which indicates a particular play.

Figure 9:
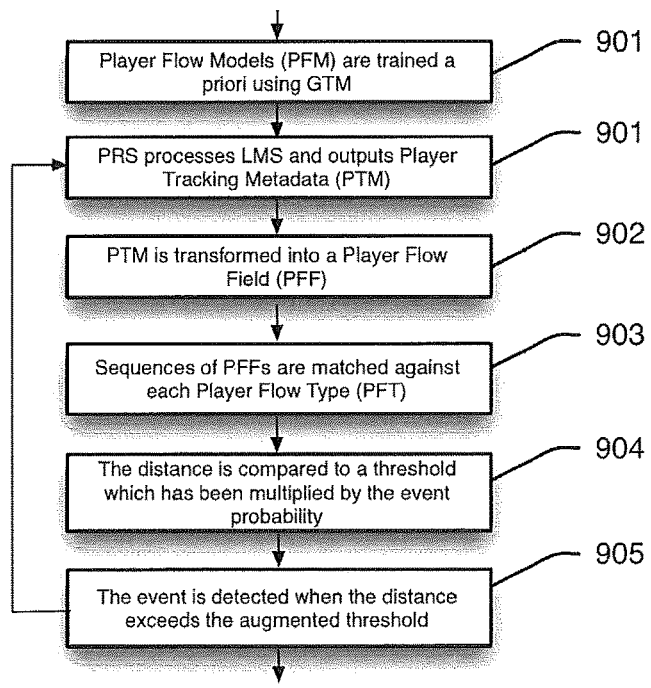
FIG. 9 illustrates in flow chart representation a process to accurately determine when an event has occurred.

The Player Flow Type (PFT) of a play can be effectively modeled and model parameters can be trained given the availability of time accurate GTM on a number of similar plays spanning a range of different game broadcasts. Each PFT is represented by a Player Flow Model (PFM). The set of Player Flow Models (PFM) statistically represents the gamut of scene motion dynamics and can be used to perform classification on every n-second segment of real time play. PFMs are trained using time accurate GTM of a number of similar plays spanning a range of different broadcasts e.g., shots-on-goal. FIG. 9 shows a flow chart of the process described above where a distance between PFF sequences is compared to a threshold that has been multiplied by the event probability (the augmented threshold). The event is detected when the distance exceeds an augmented threshold.

The graphical design details of the miniboard, shown in FIGS. 4 and 6, can vary without advanced notice, while the automatic recognition of the miniboard depends on either human spatial annotation or processor intensive spatial search. The HA can easily enter a game clock value that is synchronized closely enough to the media stream ingested by the PRS to gate or modulate the general miniboard search to save resources and avoid false positives. Optical Character Recognition (OCR) is used to search for the game clock value received from the HA and enhance the accuracy of spatially parsing of the remaining regions of the miniboard.

Figure 10:
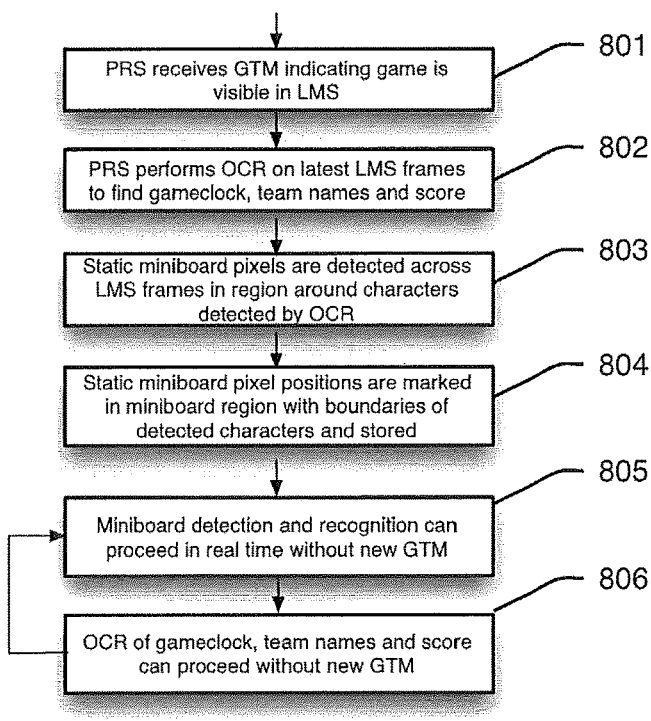
FIG. 10 illustrates in flow chart representation a process to update the graphical details of a miniboard.

The miniboard is divided into regions for logos, team names, game clock, score, etc, as indicated in FIG. 4. Static pixels at a given spatial position in a video frame sequence don't exhibit significant change between any pair of frames in the sequence. Some regions of the miniboard are static and are used by the PRS to find and localize the mini-board in the video frames. The dynamic pixels in the mini-board image are indicated by setting a mask or alpha value in the image data structure for each pixel during an initial training phase when the miniboard first appears in the game. Mask values for static pixels are set to a value that removes them from the matching process between the trained static miniboard image and each new video frame. Temporally static vs dynamic miniboard pixels are determined by computing the pixel intensity difference for a given pixel position across a time window. Static pixels will exhibit a low difference (only due to compression artifacts), while dynamic pixels will exhibit a high difference due to natural video noise and motion of the scene behind the miniboard. Advertising and other non-live-game content also contain graphics with static regions so GTM is needed to indicate when the game is active and is visible in the video to avoid false detection of the miniboard during the training of the miniboard regions. The miniboard also contains characters, e.g., the score, that don't change often enough to avoid being marked as static pixels. Bounding boxes are formed around these characters (previously recognized by OCR) and the bounding boxes are filled with dynamic mask values for each pixel in the box. FIG. 10 shows a flow chart of the process described above.

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

What is claimed:

1. A method comprising:
receiving, by a system including a processor, ground truth metadata indicating that a timed activity is visible in a live media stream;
receiving, by the system, a game clock value synchronized to the live media stream;
performing, by the system, optical character recognition on the live media stream according to the game clock value to identify game clock portions of frames of the live media stream;
determining, by the system, variances between sequences of the game clock portions of the frames of the live media stream by computing pixel intensity differences at pixel positions in the game clock portions;
identifying, by the system, static miniboard pixels and dynamic miniboard pixels according to the variances between the sequences of the game clock portions of the frames of the live media stream;
marking, by the system, positions of the static miniboard pixels and the dynamic miniboard pixels of the sequences of the game clock portions of the frames of the live media stream; and
recognizing, by the system, a miniboard display based on the marking of the positions of the static miniboard pixels and the dynamic miniboard pixels without utilizing additional ground truth metadata.

2. The method of claim 1, wherein the timed activity is a sporting event.

3. The method of claim 1, wherein the recognizing the miniboard display is in real time with receiving of the live media stream.

4. The method of claim 1, wherein the marking the positions of the static miniboard pixels is based on marking boundaries of recognized characters of static information portions of the sequences of the game clock portions of the frames of the live media stream.

5. The method of claim 1, wherein the frames of the live media stream are latest received frames.

6. A device comprising:
a processing system including a processor; and
a memory that stores executable instructions that, when executed by the processing system, facilitate performance of operations, comprising:
determining that a timed activity is visible in a live media stream;
receiving a game clock value synchronized to the live media stream;
performing optical character recognition on the live media stream according to the game clock value to identify game clock portions of frames of the live media stream;

determining variances between sequences of the game clock portions of the frames of the live media stream by computing pixel intensity differences at pixel positions in the game clock portions;

identifying, by the system, static miniboard pixels and dynamic miniboard pixels according to the variances between the sequences of the game clock portions of the frames of the live media stream;

marking positions of the static miniboard pixels and the dynamic miniboard pixels; and recognizing a miniboard display based on the marking of the positions.

7. The device of claim 6, wherein the determining that the timed activity is visible in the live media stream is based on metadata associated with the live media stream, and wherein the executable instructions further facilitate the operations of determining that the timed activity is not visible in the live media stream, thereby avoiding a false detection of the miniboard.

8. The device of claim 7, wherein the recognizing the miniboard display is without receiving and utilizing additional metadata.

9. The device of claim 6, wherein the timed activity is a sporting event.

10. The device of claim 6, wherein the recognizing the miniboard display is in real time with receiving of the live media stream.

11. The device of claim 6, wherein the marking the positions of the static miniboard pixels is based on marking boundaries of recognized characters of static information portions.

12. The device of claim 6, wherein the frames of the live media stream are latest received frames.

13. A method comprising:

determining, by a system including a processor, that a timed activity is visible in a live media stream;

receiving, by the system, a game clock value synchronized to the live media stream;

performing, by the system, optical character recognition on the live media stream according to the game clock value to identify game clock portions of frames of the live media stream:

determining, by the system, variances between sequences of the game clock portions of the frames of the live media stream by computing pixel intensity differences at pixel positions in the game clock portions;

identifying, by the system, static miniboard pixels and dynamic miniboard pixels according to the variances between the sequences of the game clock portions of the frames of the live media stream;

marking, by the system, positions of the static miniboard pixels and the dynamic miniboard pixels of the sequences of the game clock portions of the frames of the live media stream; and recognizing, by the system, a miniboard display based on the marking of the positions.

14. The method of claim 13, wherein the recognizing the miniboard display is in real time with receiving of the live media stream.

15. The method of claim 13, wherein the frames of the live media stream are latest received frames.

* * * * *